United States Patent
Kawai et al.

(10) Patent No.: US 8,361,197 B2
(45) Date of Patent: Jan. 29, 2013

(54) STRUCTURE PROVIDED WITH ZEOLITE SEPARATION MEMBRANE, METHOD FOR PRODUCING SAME, METHOD FOR SEPARATING MIXED FLUIDS AND DEVICE FOR SEPARATING MIXED FLUIDS

(75) Inventors: Masaaki Kawai, Kiyosu (JP); Toshihiro Tomita, Nagoya (JP); Nobuhiko Mori, Nagoya (JP); Aya Satoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/231,440

(22) Filed: Sep. 13, 2011

(65) Prior Publication Data

US 2012/0000358 A1 Jan. 5, 2012

Related U.S. Application Data

(63) Continuation of application No. PCT/JP2010/052683, filed on Feb. 23, 2010.

(30) Foreign Application Priority Data

Mar. 16, 2009 (JP) ................................. 2009-062770
Aug. 14, 2009 (JP) ................................. 2009-187972

(51) Int. Cl.
*B01D 53/22* (2006.01)
*B01D 71/02* (2006.01)
*B01D 19/00* (2006.01)
*C01B 39/04* (2006.01)

(52) U.S. Cl. ............... 95/46; 95/45; 95/47; 95/50; 96/4; 96/6; 96/11; 210/640; 210/500.21; 210/500.22; 210/500.26; 423/702; 423/709

(58) Field of Classification Search ................ 95/45, 46, 95/47, 50, 51; 96/4, 6, 11; 210/640, 500.21, 210/500.22, 500.26; 423/702, 709
See application file for complete search history.

(56) References Cited

U.S. PATENT DOCUMENTS

| | | | | |
|---|---|---|---|---|
| 6,090,289 A | * | 7/2000 | Verduijn et al. | 96/11 |
| 6,193,784 B1 | * | 2/2001 | Yazawa et al. | 95/45 |
| 6,689,195 B1 | | 2/2004 | Anthonis et al. | |

(Continued)

FOREIGN PATENT DOCUMENTS

| | | |
|---|---|---|
| JP | 2002-316026 A1 | 10/2002 |
| JP | 2002-537990 T | 11/2002 |

(Continued)

OTHER PUBLICATIONS

H. Sakai, et al., *p-Xylene Separation with MFI-Type Zeolite Membrane*, Separation Purification Technology, vol. 25, 2001, pp. 297-306.

(Continued)

*Primary Examiner* — Jason M Greene
(74) *Attorney, Agent, or Firm* — Burr & Brown

(57) ABSTRACT

There is provided a zeolite separation membrane-provided article having gaps or pores larger than pores inherent to zeolite crystals and controlled within an appropriate range and being capable of achieving both high permeability and high separability for components with small difference in adsorption properties or a component having a smaller molecular diameter than the diameter of the pores, a method for producing the same, a method for separating mixed fluids, and a device for separating mixed fluids. The zeolite separation membrane-provided article is provided with a zeolite membrane having an $N_2$ gas permeation speed at room temperature of $1.0 \times 10^{-6}$ mol·m$^{-2}$·s$^{-1}$·Pa$^{-1}$ or more and a permeation speed ratio of 1,3,5-trimethylbenzene/$N_2$ at room temperature of 0.17 or more and being free from dyeing caused by the impregnation with Rhodamine B.

11 Claims, 7 Drawing Sheets

U.S. PATENT DOCUMENTS

| | | | |
|---|---|---|---|
| 8,043,418 B2 * | 10/2011 | Ruud et al. | 96/4 |
| 2003/0084786 A1 * | 5/2003 | Chau et al. | 95/45 |
| 2004/0229027 A1 | 11/2004 | Mori et al. | |
| 2007/0137485 A1 * | 6/2007 | Bitterlich et al. | 96/11 |
| 2007/0184967 A1 | 8/2007 | Mori et al. | |
| 2008/0214686 A1 * | 9/2008 | Suzuki et al. | 210/500.21 |
| 2008/0217240 A1 | 9/2008 | Yabuki et al. | |
| 2009/0200236 A1 * | 8/2009 | Diefenbacher et al. | 210/640 |

FOREIGN PATENT DOCUMENTS

| | | | |
|---|---|---|---|
| JP | 2002-348579 A1 | 12/2002 | |
| JP | 2003-088735 A1 | 3/2003 | |
| JP | 2007-517648 T | 7/2007 | |
| JP | 2008-188564 A1 | 8/2008 | |
| WO | 2007/058387 A1 | 5/2007 | |
| WO | 2007/058388 A1 | 5/2007 | |
| WO | WO 2007/058387 A1 * | 5/2007 | |

OTHER PUBLICATIONS

Milcihiro Nomura, "*Research Related to Permeation Mechanism and Grain Boundary Control of Silicalite Membrane*," doctoral thesis of Chemical System Engineering of Engineering Department, Tokyo University, 1988.

Joaquin Coronas, et al., "*Separations of $C_4$ and $C_6$ Isomers in ZSM-5 Tubular Membranes*," Ind. Eng. Chem. Res., vol. 37, 1998, pp. 166-176.

Joaquin Coronas, et al., "*Characterization and Permeation Properties of ZSM-5 Tubular Membranes*," AIChE Journal, Jul. 1997, vol. 43, No. 7, 1797-1812.

* cited by examiner

STRUCTURE PROVIDED WITH ZEOLITE SEPARATION MEMBRANE, METHOD FOR PRODUCING SAME, METHOD FOR SEPARATING MIXED FLUIDS AND DEVICE FOR SEPARATING MIXED FLUIDS

FIELD OF THE INVENTION

The present invention relates to a zeolite separation membrane-provided article for separating a fluid, a method for producing the same, a method for separating mixed fluids, and a device for separating mixed fluids.

BACKGROUND OF THE INVENTION

Conventionally, a zeolite membrane, a carbon membrane, a titania membrane, and the like have been used as separation membranes disposed on a surface of a porous substrate. For example, known separation membrane-provided articles have included a zeolite membrane disposed as a separation membrane at a predetermined position on a porous substrate.

In a membrane separation by a zeolite membrane, recently, a membrane used for dehydration of organic solvent or biomass ethanol has been put into practical use. However, regarding the other uses, for example, separation of water from ethanol (ethanol condensation) in a biomass ethanol production process, separation of side chain hydrocarbon or aromatic hydrocarbon from linear chain hydrocarbon having a carbon number of 6 or more as a fuel component in petrochemistry or a petroleum refinery process, separation of inorganic gas from a linear chain hydrocarbon, or the like, development for the practical use is proceeded at present.

As membrane separation using a MFI type zeolite membrane, there is disclosed ethanol separation from a mixed liquid of ethanol and water (Patent Documents 1 and 2).

Patent Document 3 and Non Patent Document 1 disclose separation of a xylene isomer, where para-xylene is selectively permeated to block ortho-xylene and meta-xylene.

Patent Document 4 discloses separation of side-chain hydrocarbon from linear-chain hydrocarbon, and Patent Document 5 discloses separation of aromatic hydrocarbon from linear-chain hydrocarbon.

A serious problem against putting a zeolite membrane into practice lies in compatibility between permeability, and separability. Patent Documents 4 and 5 disclose usage of pores or gaps larger than the pores inherent to zeolite crystals as a measurement for solving the problem.

There is a statement that pores larger than the pores inherent to zeolite crystals have sizes of about a few nm in Non Patent Document 2. In addition, Non Patent Documents 2 and 3 disclose that, in a zeolite membrane having pores larger than the pores inherent to zeolite crystals, it is possible to separate side chain butane (isobutane) from liner chain butane (normal butane) which is a hydrocarbon isomer having a carbon number of 4.

PRIOR ART DOCUMENT

Patent Document

Patent Document 1: WO 2007/058387 pamphlet
Patent Document 2: WO 2007/058388 pamphlet
Patent Document 3: JP 2002-537990 T
Patent Document 4: JP-A-2002-348579
Patent Document 5: JP-A-2008-188564

Non Patent Document

Non Patent Document 1: H. Sakai, T. Tomita, T. Takahashi, Separation Purification Technology, 25 (2001) 297-306
Non Patent Document 2: Mikihiro Nomura, "Research related to permeation mechanism and grain boundary control of silicalite membrane", doctoral thesis of Chemical System Engineering of Engineering Department, Tokyo University, (1998)
Non Patent Document 3: J. Coronas, R. D. Noble., J. L. Falconer, "Separation of C4 and C6 Isomers in ZSM-5 Tubular Membranes", Ind. Eng. Chem. Res., 37 (1998) 166-176
Non Patent Document 4: J. Coronas, J. L. Falconer, R. D. Noble, "Characterization and Permeation Properties of ZSM-5 Tublar Membranes", AIChE Journal, July (1997), Vol. 43, No. 7, 1797-1812

It is known that separation of gas or liquid by a membrane is based on the sieving of molecules by pores of the membrane (molecular sieve effect) or the difference in affinity between the membrane and molecules (adsorption effect). Therefore, for separation of gas or liquid, the relation between the size of the pores of the membrane and the size of each of the molecules permeating the membrane is important. In the case that the pores of the membrane are too large for gas or liquid as a target for separation, the permeability improves. However, the molecular sieve effect and the adsorption effect are lost, and separability is deteriorated. On the other hand, in the case that the pores of the membrane are too small for gas or liquid as a target for separation, nothing permeates the membrane. Or, permeability is deteriorated though separability improves.

Therefore, in membrane separation, it is important to control the pore size of the membrane in an appropriate range for the system to be separated, and, in order to achieve both high permeability and high separability, it is necessary to control pores of the membrane to have a size where the permeability can be increased up to the maximum without deteriorating separability.

Patent Documents 4 and 5 disclose the use of gaps or pores larger than the pores inherent to zeolite crystals as a measure for achieving both permeability and separability in a zeolite membrane. Japanese Document 4 discloses separation of linear chain hydrocarbon having carbon numbers of 4 and 5 from side chain hydrocarbon by a zeolite membrane having pores of 1 to 10 nm besides the pores of 1 nm or less inherent to zeolite crystals. Patent Document 5 discloses separation of aromatic hydrocarbon from liner chain hydrocarbon having a carbon number of 7, where pores of zeolite and/or a grain boundary are/is used.

It is presumed that gas or liquid can be separated by the adsorption effect even when pores having large diameters in comparison with a molecule diameter of a permeable component and a non-permeable component (non Patent Document 4). However, the size of the pore exhibiting an adsorption effect depends on the target to be separated. When the difference in adsorption properties to the membrane between the permeable component and the non permeable component is small, separation is hard if the membrane has a relatively large pore. In addition, even when the difference in adsorption properties to the membrane is large, in the case that the molecular diameter of the permeable component and the non permeable component is small, separation is hard if the membrane has a relatively large pore. An example of the former case is a linear chain hydrocarbon having high carbon number, in particular, a carbon number of 6 or more and side chain hydrocarbon. Examples of the latter case are alcohol and water and a linear chain hydrocarbon and inorganic gas.

The present invention aims to provide a zeolite separation membrane-provided article being capable of achieving both high permeability and high separability for components with a small difference in adsorption properties, such as liner chain hydrocarbon having a carbon number of 6 or more and side chain hydrocarbon, or a component having a smaller molecular diameter, such as alcohol and water, linear hydrocarbon and inorganic gas.

SUMMARY OF THE INVENTION

As a result of earnest study, the present inventors found out that, according to a zeolite separation membrane-provided article provided with pores whose sizes are controlled in an appropriate range, high permeation flux and high separation coefficient can be obtained even for components with small difference in adsorption properties or components having a smaller molecular diameter than the pores besides the pores inherent to zeolite crystals. That is, according to the present invention, there is provided a zeolite separation membrane-provided article, a method for producing the same, a method for separating mixed fluids, and a device for separating mixed fluids.

According to a first aspect of the present invention, a zeolite membrane-provided article is provided with a zeolite membrane, the zeolite membrane-provided article having an $N_2$ gas permeation speed at room temperature of $1.0 \times 10^{-6}$ mol·m$^{-2}$·s$^{-1}$·Pa$^{-1}$ or more and a permeation speed ratio of 1,3,5-trimethylbenzene/$N_2$ at room temperature of 0.17 or more and being free from dyeing caused by the impregnation with Rhodamine B.

According to a second aspect of the present invention, a zeolite membrane-provided article is provided with a zeolite membrane, where pore sizes of pores inherent to zeolite crystals are 0.76 nm or less and where pore sizes of pores other than the pores inherent in zeolite crystals are 0.76 to 2 nm.

According to a third aspect of the present invention, the zeolite membrane-provided article according to the first or second aspects is provided, wherein the zeolite membrane is formed on a surface of a support of a porous material.

According to a fourth aspect of the present invention, the zeolite membrane-provided article according to any one of first to third aspects is provided, wherein the zeolite membrane is a MFI membrane.

According to a fifth aspect of the present invention, the zeolite membrane-provided article according to any one of first to fourth aspects is provided, wherein the zeolite membrane is a silicalite membrane.

According to a sixth aspect of the present invention, the zeolite membrane-provided article according to any one of first to fifth aspects is provided, which is used for separation of a mixed fluid of two or more different components.

According to a seventh aspect of the resent invention, a method for producing a zeolite membrane-provided article is provided, comprising: a seed crystal-forming step of putting a seeding sol containing silica, water, and a structure directing agent and a support in a pressure resistant container in a state that the support is immersed in the seeding sol, followed by heating the inside of the pressure resistant container to form zeolite seed crystals on a surface of the support; a membrane-forming step of growing the zeolite seed crystal to form a dense zeolite membrane containing the structure directing agent on the surface of the support; and a removal step of removing the structure directing agent from the dense zeolite membrane; wherein the removal treatment in the removal step is performed by a heat treatment, the heat treatment is performed in a maximum temperature range of 400 to 1000° C. and includes a temperature rise step at a temperature rise speed of 0.1° C./min. or more and a temperature fall step at a temperature fall speed of 0.5° C./min. or more, and the zeolite membrane-provided article provided with a zeolite membrane has an $N_2$ gas permeation speed at room temperature of $1.0 \times 10^{-6}$ mol·m$^{-2}$·s$^{-1}$·Pa$^{-1}$ or more and a permeation speed ratio of 1,3,5-trimethylbenzene/$N_2$ at room temperature of 0.17 or more and is free from dyeing caused by the impregnation with Rhodamine B.

According to an eighth aspect of the present invention, in the method for producing a zeolite membrane-provided article according to the seventh aspect, the zeolite membrane is a MFI membrane.

According to a ninth aspect of the present invention, in the method for producing a zeolite membrane-provided article according to seventh or eighth aspects, the zeolite membrane is a silicalite membrane.

According to a tenth aspect of the present invention, a method for separating a mixed fluid is provided, wherein a mixed fluid of two or more different components is separated by using a zeolite membrane-provided article according to any one of first to sixth aspects.

According to an eleventh aspect of the present invention, a mixed fluid separation device having a zeolite separation membrane-provided article according to any one of first to sixth aspects is provided, comprising: a separation section for separating a raw material side space from a permeation side space by a porous substrate, a supply section for supplying a mixed fluid to the raw material side space, a permeation collection section for collecting permeation liquid and/or permeation gas having penetrated the zeolite membrane.

A zeolite separation membrane-provided article of the present invention has gaps or pores of 0.76 nm or more and about 2 nm or less, which are larger than the pores inherent to zeolite crystals. Therefore, the zeolite separation membrane-provided article can achieve both high permeability and high separability in the case of separation of side chain hydrocarbon from linear chain hydrocarbon, aromatic hydrocarbon from linear chain hydrocarbon, water from alcohol, or inorganic gas from linear chain saturated hydrocarbon.

DETAILED DESCRIPTION OF THE INVENTION

Figure 1A:
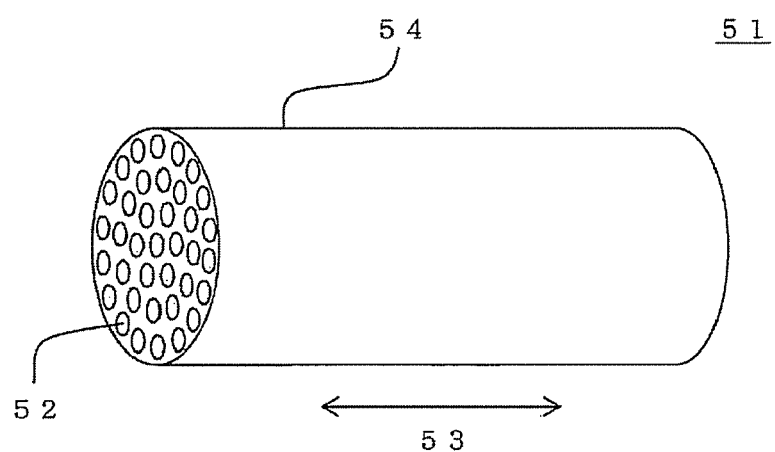
FIG. 1A is a perspective view showing an embodiment (monolith shape) of a support used for a method for producing a zeolite separation membrane-provided article of the present invention.

Hereinbelow, an embodiment of the present invention will be described with referring to drawings. The present invention is by no means limited to the following embodiment, and changes, modifications, and improvements may be added as long as they do not deviate from the scope of the present invention.

(1) Zeolite Separation Membrane-Provided Article:

A zeolite separation membrane-provided article of the present invention has an $N_2$ gas permeation speed at room temperature of $1.0 \times 10^{-6}$ mol·m$^{-2}$·s$^{-1}$·Pa$^{-1}$ or more and a permeation speed ratio of 1,3,5-trimethylbenzene/$N_2$ at room temperature of 0.17 or more and is free from dyeing caused by the impregnation with Rhodamine B. In the zeolite membrane-provided article, pore sizes of pores inherent in zeolite crystals are 0.76 nm or less and where pore sizes of pores other than the pores inherent to zeolite crystals are 0.76 to 2 nm. The zeolite membrane is formed on a surface of a support of a porous material. The zeolite membrane is preferably a MFI membrane, more preferably a silicalite membrane.

(1-1) Pore:

A zeolite separation membrane-provided article of the present invention can be used for separation of a mixed fluid of two or more different components. The article has gaps or pores larger (0.76 to about 2 nm) than the pores (0.5 to 0.6 nm in the case of a MFI membrane) inherent to zeolite crystals. Specifically, a zeolite separation membrane-provided article has an $N_2$ gas permeation speed at room temperature of $1.0 \times 10^{-6}$ mol·m$^{-2}$·s$^{-1}$·Pa$^{-1}$ or more, preferably $2.0 \times 10^{-6}$ mol·m$^{-2}$·s$^{-1}$·Pa$^{-1}$ or more. The higher amount of pores is more preferable, and the $N_2$ gas permeation speed within the above range means that the amount of pores are larger than a certain amount regardless of the sizes of pores.

In addition, a zeolite separation membrane-provided article of the present invention has a permeation speed ratio of 1,3,5-trimethylbenzene/$N_2$ of 0.17 or more, preferably 0.20 or more. The case that the permeation speed ratio of 1,3,5-trimethylbenzene/$N_2$ is within the aforementioned range means that a large number of gaps or pores larger than pores inherent to the zeolite crystals are present. Therefore, it is possible to allow molecules having smaller molecular diameter than 1,3,5-trimethylbenzene (molecular diameter of 0.76 nm).

The $N_2$ gas permeation speed (A) means the entire pore amount, and the 1,3,5-trimethylbenzene permeation speed (B) means the amount of gaps or pores larger than the pores inherent to zeolite crystals. Therefore, the permeation speed ratio (B/A) of 1,3,5-trimethylbenzene/$N_2$ means the ratio of the large gaps or pores with respect to the entire pore amount. For achieving both high permeability and high separability, it is important that the B/A is high.

Further, a zeolite separation membrane-provided article of the present invention is free from dyeing caused by the impregnation with Rhodamine B (a molecular diameter of about 2 nm), and molecules having larger particle sizes than Rhodamine B can be blocked. In the case of having the dyeing due to the impregnation with Rhodamine B, sufficient separation performance cannot be obtained.

The zeolite membrane formed in a zeolite separation membrane-provided article of the present invention has gaps (pores) larger than the pores inherent to the zeolite crystals. When the pore diameter is too small, the permeation flux is small. Therefore, a pore having a size where 1,3,5-trimethylbenzene (molecular diameter of 0.76 nm) passes is necessary. On the other hand, when the pore diameter is too large, separation performance cannot be maintained. Therefore, a hole where Rhodamine B (molecular diameter of about 2 nm) does not pass, i.e., where no dyeing is caused is necessary.

In addition, a zeolite membrane formed on a zeolite separation membrane-provided article of the present invention has a peak of the pore diameter of 0.76 nm or less and a peak of the range of 0.76 to 2 nm in the pore distribution measurement by an adsorption method of $N_2$. Preferably, the ratio of the pore volume of pore diameter of 2 to 40 nm to the pore volume of pore diameter of 0.76 to 2 nm is ⅓ or less. In the case that the ratio of the pore volume of the pore diameter of 2 to 40 nm to the pore volume of the pore diameter of 0.76 to 2 nm is within the aforementioned range, it can be said that the gap and pores larger than the pores inherent to zeolite crystals is 0.76 to 2 nm with substantially no pore larger than 2 nm.

From the above, a zeolite membrane-provided article of the present invention is a zeolite separation membrane-provided article having pores inherent to zeolite crystals and pores other than the pores inherent to the zeolite crystals in the range from 0.76 nm or more to 2 nm or less. The zeolite membrane-provided article having the pore diameters within the range found out in the present application can suitably be used for separation of side chain hydrocarbon from linear chain hydrocarbon, aromatic hydrocarbon from linear chain hydrocarbon, water from alcohol, inorganic gas from linear hydrocarbon, and both high permeability and high separation can be achieved.

Specific examples of component systems in the system of liner chain hydrocarbon and side chain hydrocarbon include saturated hydrocarbon of a carbon number of 5 to 9 or unsaturated hydrocarbon, for example, n-hexane, n-heptane, n-octane, n-hexene, 1-heptene, and 2-octene for linear chain hydrocarbon, saturated hydrocarbon of a carbon number of 5 to 9 or unsaturated hydrocarbon, for example, 2-methylbutane, 2,2-dimethylbutane, 2,3-dimethylbutane, isooctane, 2-methyl-1-butene, and isooctene for side chain hydrocarbon. In the system of linear chain hydrocarbon and aromatic hydrocarbon, examples of the linear chain hydrocarbon include saturated hydrocarbon of a carbon number of 5 to 9 or unsaturated hydrocarbon, for example, n-hexane, n-heptane, n-octane, n-hexene, 1-heptene, and 2-octene, and examples of the aromatic hydrocarbon include benzene, toluene, and xylene. In the system of alcohol and water, examples of the alcohol include ethanol, methanol, butanol, and isopropanol. In the system of linear chain hydrocarbon and inorganic gas, examples of the linear chain hydrocarbon include methane, ethane, propane, propylene, butane, and 1-butene, examples of inorganic gas include $N_2$, He, and Ar.

(1-2) Membrane Thickness:

The zeolite membrane constituting a zeolite separation membrane-provided article of the present invention has a membrane thickness of 1 to 30 μm, preferably 1 to 20 μm, particularly preferably 1 to 15 μm. When the thickness is smaller than 1 μm, it may be impossible to completely coat the surface of the support with a dense membrane, and separation coefficient may become low upon separating alcohol from water, upon separating side chain hydrocarbon from the linear chain hydrocarbon, and upon separating aromatic hydrocarbon from the linear chain hydrocarbon. When the membrane thickness is larger than 30 μm, it may be impossible to obtain sufficient permeation flux. Here, the thickness of the zeolite membrane is a value obtained by observing a cross section of a separation membrane by a scanning electronic microscope (SEM), and the membrane thickness of 1 to 30 μm means the minimum membrane thickness of 1 μm or more and the maximum membrane thickness of 30 μm or less.

Figure 1B:
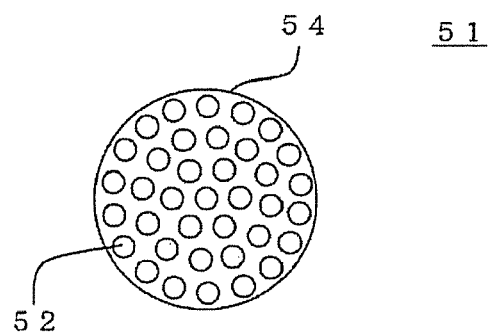
FIG. 1B is a cross-sectional view showing an embodiment (monolith shape) of a support used for a method for producing a zeolite separation membrane-provided article of the present invention.

(1-3) Support:

The zeolite separation membrane-provided article of the present invention is an article where a zeolite membrane is disposed on the surface of the support. Since the zeolite membrane is disposed on the surface of the support, it is possible to inhibit damages or the like with maintaining the shape supported by the support even if the zeolite membrane is thin. There is no particular limitation on the support as long as seed crystals of the zeolite membrane can be formed on the surface thereof to form a zeolite membrane, and the material, shape, and size can suitably be determined according to the use and the like. Examples of the material constituting the support include ceramics such as alumina (α-alumina, γ-alumina, anodized alumina, and the like) and zirconia; metal such as stainless steel; and the like. Alumina is preferable in view of easiness in support production and availability, and alumina formed and sintered with alumina particles having a mean particle diameter of 0.001 to 30 μm as a raw material is preferable. The support is preferably porous. Though the shape of the support may any of a plate shape, a cylindrical shape, a tubular shape having a polygonal cross section, a monolith shape, and a spiral shape; a monolith shape is preferable. Here, the monolith shape is a shape where a plurality of passages (channels) 52 are formed in parallel to the axial direction 53 as the support 51 shown in FIGS. 1A and 1B. FIGS. 1A and 1B show an embodiment (monolith shape) of a support used in a method for producing a zeolite separation membrane-provided article of the present invention. FIG. 1A is a perspective view, and FIG. 1B is a plan view. As the support 51, in particular, a monolith-shaped porous article 54 is preferable. Such a support of a monolith-shaped porous article can be formed by a known production method, for example, extrusion forming.

(II) Production Process:

A method for producing a zeolite separation membrane-provided article of the present invention will be described. In particular, specific description will be described with an example of a MFI type zeolite. However, since a method for producing a zeolite separation membrane-provided article of the present invention is characterized by allowing the zeolite seed crystals to appropriately adhere to the support, the method can be applied naturally to conventionally known zeolites such as MOR, AFI, BEA, FER, and DDR.

A method for producing a zeolite separation membrane-provided article of the present invention is a method for producing a zeolite separation membrane-provided article, the method having a seed crystal-forming step of putting a seeding sol containing silica, water, and a structure directing agent and a support in a pressure resistant container in the state that the support is immersed in the seeding sol, followed by heating the inside of the pressure resistant container to form a zeolite seed crystal on a surface of the support; a membrane-forming step of growing the zeolite seed crystal to form a zeolite membrane on the surface of the support; and a removal step of removing the structure directing agent at a predetermined speed.

(II-1) Seed Crystal-Forming Step:

(II-1-1) Seeding Sol:

The seeding sol used in a method for producing a zeolite separation membrane-provided article of the present invention is a silica sol where silica fine particles are dispersed in water, and at least structure directing agent is contained therein. The seeding sol can be obtained by mixing predetermined amounts of silica sol having a predetermined concentration, water for adjusting the concentration, and aqueous solution of a structure directing agent of a predetermined concentration. The seeding sol is crystallized to form zeolite by a hydrothermal treatment described later, and a structure where a molecule of the structure directing agent is surrounded by silica atoms derived from the silica sol is formed. By the heat treatment described later, the structure directing agent is removed from the structure, and a zeolite crystal having a pore shape specific for a structure directing agent can be formed.

As the silica sol, a commercial silica sol (e.g., Trade name: Snowtex S produced by Nissan Chemical Industries, Ltd., with solid content concentration of 30 mass %) can suitably be used. Here, the solid content means silica. However, the silica sol may be prepared by dissolving a fine powdered silica in water or by subjecting alkoxysilane to hydrolysis.

The seeding sol has a molar ratio (water/silica molar ratio: value obtained by dividing the molar number of water by the molar number of silica) of water to silica (fine particles) contained in the sol is preferably water/silica=10 to 50, more preferably 20 to 40. Thus, by raising the silica concentration of the seeding sol, the zeolite seed crystals become fine particles, and it is possible to allow the zeolite seed crystals to adhere to the surface of the substrate. When the water/silica molar ratio is smaller than 10, the zeolite crystals may non-homogeneously and excessively precipitate on the surface of the support, and, when it is larger than 50, there is the case that the zeolite crystals do not precipitate on the surface of the support. Here, a state that the zeolite crystals adhere to the surface of the support can be shown quantitatively as a rate (area rate on the photo) of the zeolite seed crystal covering the surface of the support in a scanning electron microscope (SEM) photograph, and the rate is preferable 5 to 100%.

As the structure directing agent of the MFI-type zeolite, there is used tetrapropylammonium hydroxide (TPAOH) or tetrapropylammonium bromide (TPABr) generating tetrapropylammonium ion (TPA). Therefore, as the aqueous solution of a structure directing agent is suitably used an aqueous solution containing TPAOH and/or TPABr.

As a silica sol, it is also preferable to use a material containing hydroxide of alkali metal or alkali earth metal besides silica fine particles. Though TPAOH used as the structure directing agent of a MFI type zeolite is a relatively expensive reagent, according to this method, a TPA source and an alkali source can be obtained from relatively economical TPABr and a hydroxide of alkali metal or the like. That is, according to this method, the amount of the expensive TPAOH used can be reduced, the raw material cost can be reduced, and zeolite can be produced inexpensively.

Upon mixing a silica sol and an aqueous solution of a structure directing agent, they are mixed in such a manner that the molar ratio of TPA to silica (TPA/silica ratio) is within the range of preferably 0.05 to 0.5, more preferably 0.1 to 0.3. When the TPA/silica ratio is below 0.051, there is a case that seed crystals do not precipitate. When the ratio is above 0.5, excessive seed crystals may precipitate on the surface of the support.

Incidentally, since a substitute used as a structure directing agent depends on the type of zeolite, a structure directing agent according to zeolite of a desired type is appropriately selected and used. For example, there is used tetraethylammonium hydroxyde (TEAOH), tetraethylammonium bromide (TEABr), or the like in the case of a BEA type zeolite (also referred to as "β-zeolite"); or 1-adamanthaneamine or the like in the case of DDR type zeolite. The molar ratio of a structure directing agent to silica (structure directing agent/silica ratio) may be determined according to a conventionally known synthesis method.

In addition, it is preferable that water added upon preparing a seeding sol does not contain an impurity ion, and, specifically, it is preferable that the water is distilled water or an ion-exchange water.

(II-1-2) Support:

The support is not particularly limited as long as zeolite seed crystals can be formed on the surface to form a zeolite membrane, and the material, the shape, and the size can appropriately be determined in accordance with the usage or the like. As a material constituting the support, alumina is preferable in view of easiness in support production and availability, and alumina formed and sintered with alumina particles having a mean particle diameter of 0.001 to 30 μm as a raw material is preferable. The support is preferably porous. The shape of the support is preferably a monolith shape.

Figure 2:
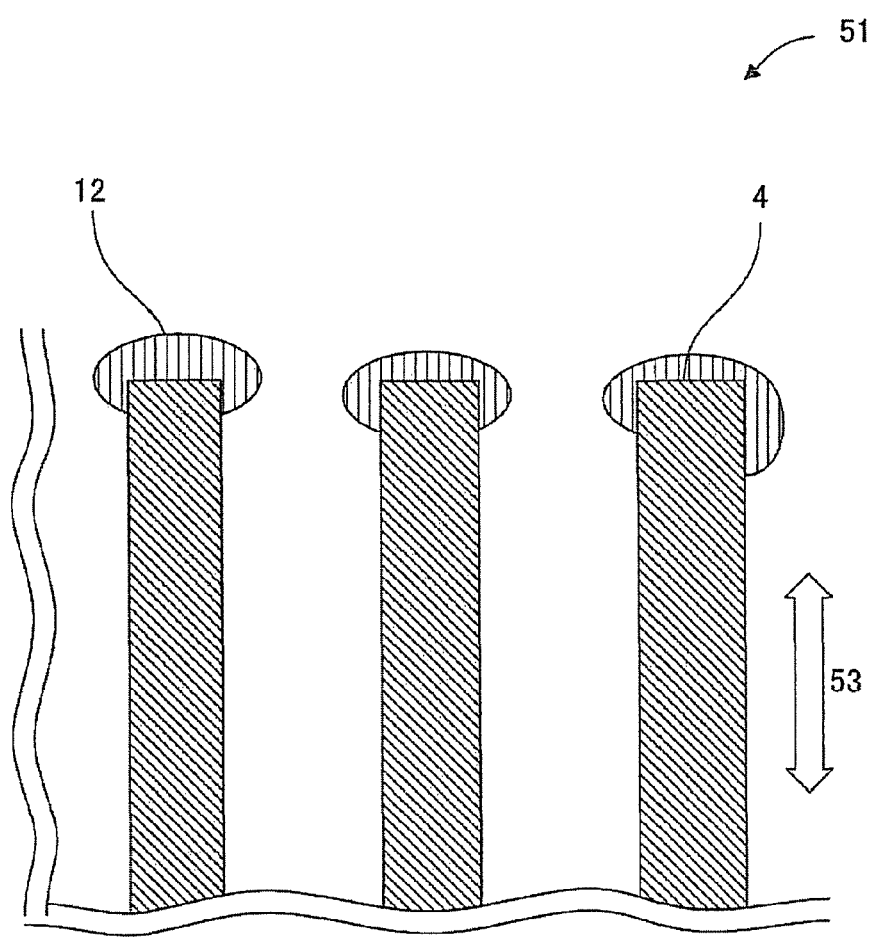
FIG. 2 is a cross-sectional view showing an end face and the vicinity of the outer peripheral face of the porous substrate before the separation membrane is disposed.

It is preferable to form a seal portion 12 as shown in FIG. 2 by applying glass paste on both the end faces of the substrate 51 and heating at predetermined temperature. As the seal portion 12 of the support, glass seal or metal seal may be employed. Of these, glass seal is preferable in that it is excellent in matching the thermal expansion coefficient with a porous substrate. Though there is no particular limitation on the properties of the glass used for the glass seal, it is preferable that the glass has a thermal expansion coefficient close to that of the porous support. In addition, as the glass used for glass seal, nonleaded glass which does not contain lead or the like is preferable.

For forming a sealing portion 12, in the first place, a glass paste is applied on a surface of the support 51. There is no particular limitation on the portion where the glass paste is applied, and it is preferable to apply the glass paste in a portion for inhibiting gas, liquid, fine particles, and the like from moving from the inside of the support 51 to the outside or from the outside to the inside of the support 51. In the present embodiment, the glass paste is applied on both the end faces 4, 4 of the support 51.

(II-1-3) Formation of Zeolite Seed Crystals:

In order to form zeolite seed crystals, in the first place, the support and the seeding sol are put in a pressure resistant container. At this time, the support is disposed to be immersed in a seeding sol. Then, a pressure resistance container is heated, and zeolite seed crystals are generated on a surface of the support by hydrothermal synthesis.

Though there is no particular limitation on the pressure resistant container, there can be used a stainless steel pressure resistant container with a fluorine resin inner cylinder, a nickel metal pressure resistant container, a fluorine resin pressure resistant container, or the like. When the support is immersed in the seeding sol, it is preferable to immerse at least a portion where zeolite seeding crystals are allowed to precipitate in the seeding sol, or the entire support may be immersed in the seeding sol. The temperature upon the hydrothermal synthesis is 90 to 130° C., more preferably 100 to 120° C. When the temperature is lower than 90° C., the hydrothermal synthesis hardly proceeds. When the temperature is above 130° C., it is impossible to obtain fine particles of zeolite seed crystals. In particular, in the case that the support is a porous article obtained by sintering alumina particles, by specifying the temperature of hydrothermal synthesis in the aforementioned range (90 to 130° C.), it is possible to cover the surface of the alumina particles located on the surface of the support with zeolite seed crystals. The time for the hydrothermal synthesis is preferably 3 to 18 hours, more preferably 6 to 12 hours. When it is shorter than 3 hours, there is a case that the hydrothermal synthesis does not proceed sufficiently. When it is longer than 18 hours, the zeolite seed crystal becomes too large. Thus, in the case that zeolite seed crystals are allowed to precipitate directly on the surface of the support by hydrothermal synthesis, the zeolite seed crystals are hardly peeled off from the support. Therefore, when the zeolite membrane is formed, problems of the defect of the membrane, unevenness of the membrane thickness, and the like, can be inhibited.

In addition, examples of the method for heating include a method of heating the pressure resistant container put in a hot air drier and a method of heating the pressure resistant container with directly attaching a heater to the container.

The particle diameter of the zeolite seed crystals obtained is preferably 1 μm or less, more preferably 0.5 μm or less, particularly preferably 0.01 to 0.5 μm. When it is larger than 1 μm, there is a case that a dense zeolite membrane having few defects in a membrane-forming step and a uniform thickness cannot be formed. Here, the particle diameter of the zeolite seed crystals is obtained by a scanning electron microscope (SEM) observation. When the particle diameter of 1 μm or less is referred, it means that the maximum particle size is 1 μm or less.

After the precipitation of the zeolite seed crystals on the surface of the support, the support is preferably subjected to boil washing by the use of water. This enables to inhibit superfluous zeolite from forming. Though the washing time is not particularly limited as long as the seeding sol is washed out, it is preferable to repeat washing for 0.5 to 3 hours one to five times. After the washing, it is preferable to dry it at 60 to 120° C. for 4 to 48 hours.

In addition, in the case of using a monolith-shaped porous article 54 as shown in FIGS. 1A and 1B as the support, the zeolite seed crystal is preferably formed on the surfaces of the channels 52 of the support 51. In this case, when the support 51 is immersed in the seeding sol, it is preferably immersed in the state that the outer peripheral surface is covered with a tape of fluorine resin or the like.

(II-2) Membrane-Forming Sol:

In the membrane-forming sol, the same materials as the silica sol, structure directing agent, and water contained in the aforementioned seeding sol are used as the raw materials, and more water than the case of the seeding sol is used to preferably use a material having lower concentration than the seeding sol.

The molar ratio of water and silica (fine particles) (water/silica molar ratio) contained in the membrane-forming sol is preferably water/silica=100 to 700, more preferably 200 to 500. When water/silica molar ratio is 100 to 700, a dense zeolite membrane having few defects and even thickness can be formed. When water/silica molar ratio is smaller than 100, since a silica concentration becomes high, zeolite crystals precipitate in the membrane-forming sol to deposit on the surface of the zeolite membrane, a crack or the like may be easily caused upon the activation treatment such as firing. In addition, when a water silica molar ratio is larger than 700, there is a case that it is difficult to make a zeolite membrane hard. Here, to be dense means that no impregnation with Rhodamine B is caused after the membrane formation.

In the membrane-forming sol, upon mixing the silica sol with the aqueous solution of structure directing agent, they are mixed in such a manner that the molar ratio of TPA to silica (TPA/silica molar ratio) is within the range of preferably 0.01 to 0.5, more preferably 0.02 to 0.3. When the TPA/silica ratio is below 0.01, it is difficult to make the membrane dense. When the ratio is above 0.5, the zeolite crystal may deposit on the surface of the membrane.

(II-2-2) Membrane Formation:

The zeolite seed crystals having precipitated on the surface of the support are grown by hydrothermal synthesis to form a zeolite membrane of zeolite crystals grown in a membrane form. In order to form a zeolite membrane on the surface of the substrate, in the first place, the support where the zeolite seed crystals have precipitated and the membrane-forming sol are put in a pressure resistant container. At this time, the support is disposed so that it is immersed in the membrane-forming sol. Then, the pressure resistant container is heated to form a zeolite membrane on a surface of the support by hydrothermal synthesis. Incidentally, since the zeolite membrane obtained by hydrothermal synthesis contains tetrapropylammonium, it is preferable that a heat treatment is performed after the hydrothermal synthesis.

As the pressure resistant container, it is preferable to use the pressure resistant container used for the aforementioned formation of zeolite seed crystals. When the support is immersed in the membrane-forming sol, it is preferable to immerse a portion where the zeolite membrane is formed in the membrane-forming sol, and the entire support is immersed in the membrane-forming sol. The temperature upon performing hydrothermal synthesis is preferably raised up to 100 to 200° C.

The temperature upon performing hydrothermal synthesis is preferably 100 to 200° C., more preferably 120 to 180° C. Such a temperature range enables to obtain a dense zeolite membrane having a uniform thickness and few defects. In a method for producing a zeolite membrane-provided article of the present invention, it is possible to produce such a high-quality membrane with good repeatability, and the production efficiency is high. When the temperature is lower than 100° C., hydrothermal synthesis may hardly progress. When the temperature is above 200° C., it may be difficult to make the resultant zeolite membrane dense with uniform thickness and few defects.

In addition, the synthesis time of the hydrothermal synthesis is preferably 3 to 120 hours, more preferably 6 to 90 hours, particularly preferably 10 to 72 hours. When the time is shorter than 3 hours, there is a case that the hydrothermal synthesis does not proceed sufficiently. When the time is longer than 120 hours, the zeolite membrane may become too thick with uneven thickness. Here, to be dense means that no impregnation with Rhodamine B is caused after the membrane formation. In addition, when the zeolite membrane is dense, no surface of the support is exposed in the case of observation with a scanning electron microscope (SEM).

After the zeolite membrane is formed on the surface of the support by hydrothermal synthesis, it is preferable to subject the support to boil washing. This enables to inhibit superfluous zeolite crystals to adhere to the zeolite membrane. Though the washing time is not particularly limited, it is preferable to repeat washing for 0.5 to 3 hours one to five times. After the washing, it is preferable to dry it at 60 to 120° C. for 4 to 48 hours.

(II-3) Membrane Growing Step:

It is preferable that a method for producing the zeolite separation membrane-provided article of the present embodiment has at least one membrane-growing step where the zeolite membrane formed on the surface of the support is further grown after the aforementioned "(2) Membrane-formation step". In particular, in the case that the support is monolith-shaped and that a zeolite membrane is formed on the surfaces of the channels, there is a case that the silica component contained in the membrane-forming sol is insufficient in the channels to make membrane formation insufficient only by "(2) membrane-forming step". In such a case, by further growing the zeolite membrane in the membrane-forming step, a zeolite membrane having a desired thickness can be formed. The membrane-growing step may be performed not only once, but also two or more times.

The operations of membrane growing step are preferably the same as those of the "(II-2) membrane-forming step" except that the "support where a zeolite membrane is formed on the surface obtained in the (2) membrane-forming step" is used in place of using the "support where the zeolite seed crystals have precipitated on the surface thereof obtained in the (1) seed crystal-forming step".

(II-4) Removal Step:

In the following structure directing agent removal step, by subjecting the zeolite membrane formed on the surface of the support obtained by the aforementioned method is subjected to a heat treatment (activating treatment), tetrapropylammonium is removed to finally form a zeolite membrane. The heating temperature (maximum temperature) is preferably 400 to 1000° C., particularly preferably 500 to 800° C. In the temperature rise step up to the heating temperature, the temperature rise speed is preferably 0.1° C./min. or more, more preferably 0.2° C./min. or more. There may be used a method where the temperature is raised in the aforementioned temperature range by putting a zeolite separation membrane-provided article in a heating appliance where the temperature is maintained in the aforementioned temperature range. The heating time is preferably 1 to 60 hours. In the temperature fall step after the heat treatment, the temperature fall speed is preferably 0.5° C./min. or more, particularly preferably 1° C./min. or more. By taking out the zeolite separation membrane-provided article from the heating appliance where the temperature is maintained in the aforementioned range to be exposed to low temperature, the temperature can be decreased in the aforementioned temperature range. As the appliance used for the heating, an electric furnace or the like can be used.

By the steps described above, a zeolite membrane 11 is disposed on the support 51, and there can be produced a separation membrane-provided article provided with a zeolite membrane 11 having an $N_2$ gas permeation speed at room temperature of $1.0 \times 10^{-6}$ mol·m$^{-2}$·s$^{-1}$·Pa$^{-1}$ or more and a permeation speed ratio of 1,3,5-trimethylbenzene/$N_2$ at room temperature of 0.17 or more and being free from dyeing caused by the impregnation with Rhodamine B.

(III) Liquid Separation Method:

As a method for separating a mixed fluid of two or more different components using a zeolite separation membrane-provided article of the present invention, there may be employed a method where gas permeation is caused with supplying the mixed fluid as a liquid (pervaporation method) or a method where gas permeation is caused by supplying the mixed fluid as steam.

Figure 5:
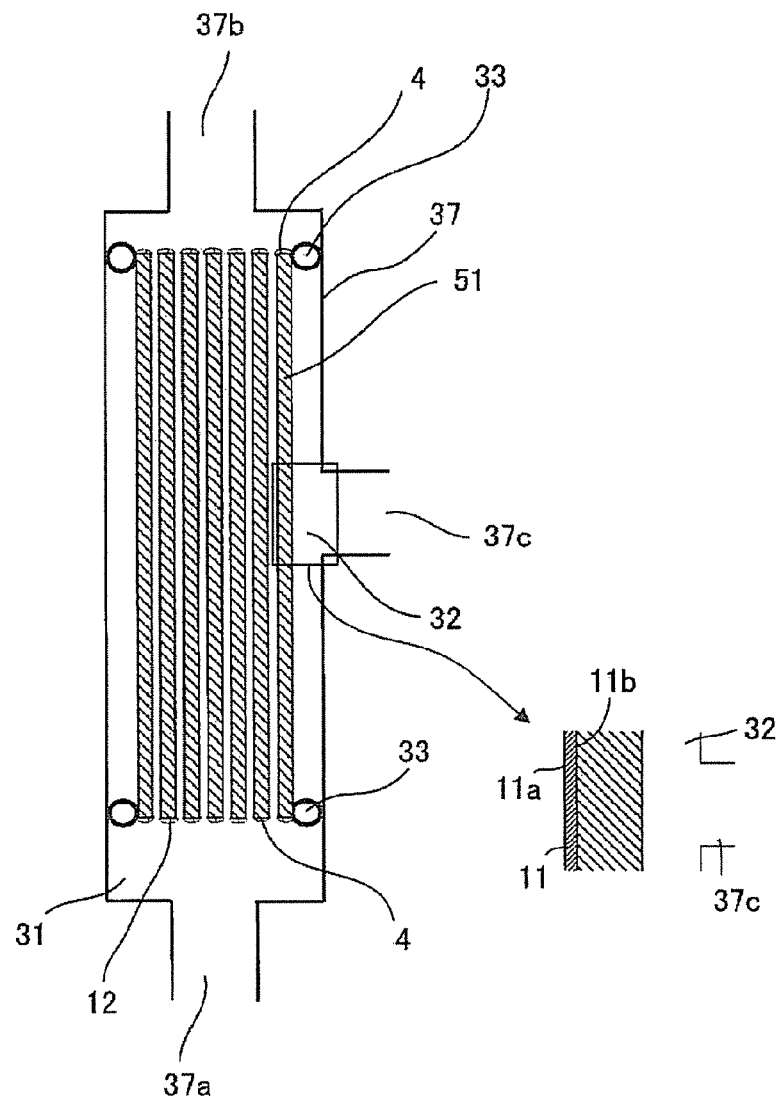
FIG. 5 is a cross-sectional view showing a SUS module provided with a zeolite separation membrane-provided article of the present invention.
Figure 6:
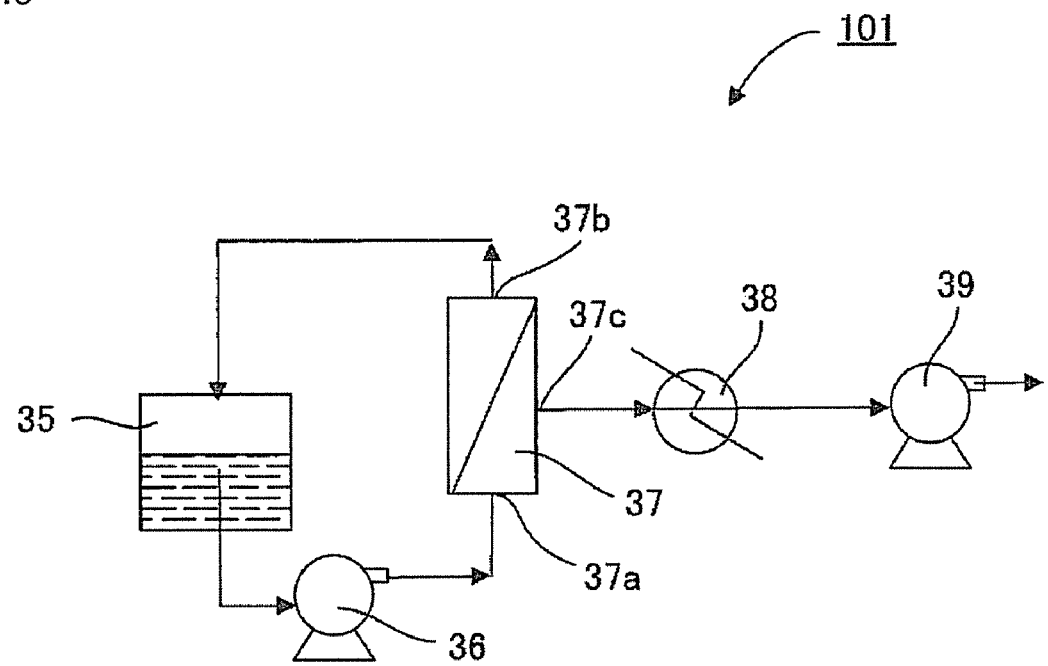
FIG. 6 is a cross-sectional view showing an embodiment of a test apparatus for performing a separation test of a liquid-mixed fluid.

Specifically, the separation can be performed by the use of a mixed fluid separation device 101 as shown in FIGS. 5 to 6. That is, the mixed fluid separation device 101 of the present invention includes a separation section for separating a raw material side space from a permeation side space by a porous substrate, a supply section for supplying a mixed fluid to the raw material side space, a permeation collection section for collecting permeation liquid and/or permeation gas having penetrated the mixed fluid separation membrane. The separation section is provided with the aforementioned zeolite membrane 11 for the mixed fluid and constituted of a SUS module 37 having a porous support 51 supporting the zeolite membrane 11. In addition, the supply section is constituted of a raw material tank 35 and a circulation pump 36, and the permeation collection section is constituted of a cooling trap 38 as a cooling apparatus and a vacuum pump 39.

Hereinbelow, a case where the fluid is liquid will be described. The raw material tank 35 heats the liquid mixture (raw material) put in a tank and maintains the mixture at a predetermined temperature (e.g., 50° C.).

In the SUS module 37, a supply fluid introduction port 37a and the supply fluid discharge port 37b are formed in such a manner that they communicate with the raw material side space 31, and a permeation fluid collection port 37c for discharging the permeation steam outside is formed in the permeation side space 32. The liquid mixture in the raw material tank 35 is supplied to the raw material side space 31 of the SUS module 37 by the circulation pump 36.

The SUS module 37 is constituted in such a manner that the monolith-shaped substrate (support) 51 having a zeolite membrane formed thereon can be disposed in a predetermined position by means of an O-ring 33 on the outer peripheral portions of both the ends. The SUS module 37 is separated into the raw material side space 31 and the permeation side space 32 by the glass seal (seal portion 12) and the zeolite membrane 11.

On the permeation fluid collection port 37c side of the SUS module 37, the cooling trap 38, and the vacuum pump 39 are provided to collect permeation steam discharged from the permeation fluid collection port 37c by a liquid $N_2$ trap (cooling trap 38).

By the aforementioned constitution, the raw material is supplied to the raw material side space 31 of the SUS module 37 by the supply fluid introduction port 37a by a circulation pump 36, and the raw material discharged from the supply fluid discharge port 37b is returned to the raw material tank 35 to circulate the raw material. In a method for separating a mixed fluid of the present invention, the aforementioned liquid mixture is used as the raw material. Alternatively, there is used a gas mixture where a liquid mixture is evaporated by providing a carburetor between the raw material tank 35 and the SUS module 37. The mixture is brought into contact with a membrane supply side 11a of the zeolite membrane 11 as a supply mixture from the supply fluid introduction port 37a. By reducing the pressure on the support side of the zeolite membrane by the vacuum pump 39, a component permeates toward the membrane permeation side 11b of the zeolite membrane 11, and the permeation steam discharged from the permeation fluid collection port 37c is collected by a liquid $N_2$ trap. The degree of vacuum of the permeation side space 32 is controlled to be a predetermined reduced pressure (e.g, about 0.5 Torr) by a pressure controller. This enables to separate a mixed fluid.

Figure 7:
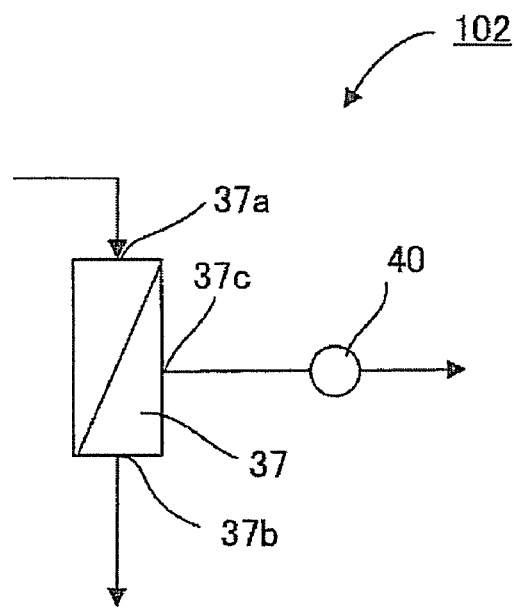
FIG. 7 is a schematic view showing an embodiment of a test apparatus for performing a separation test of a gas-mixed fluid.

(IV) Gas Separation Method:

Specifically, gas separation can be performed by using, for example, a mixed fluid separation device 102 as shown in FIGS. 5 and 7. That is, the mixed fluid separation device 102 of the present invention includes a separation section for separating a raw material side space from a permeation side space, a supply section for supplying a mixed fluid to the raw material side space, a permeation collection section for collecting permeation gas having penetrated the mixed fluid separation membrane from the permeation side space. The separation section is provided with the aforementioned zeolite membrane 11 for a mixed fluid and constituted of a SUS module 37 having a porous substrate 51 supporting the membrane 11.

In the SUS module 37, a supply fluid introduction port 37a and the supply fluid discharge port 37b are formed in such a manner that they communicate with the raw material side space 31, and a permeation fluid collection port 37c for discharging the permeation steam outside is formed in the permeation side space 32.

The SUS module 37 is constituted in such a manner that the monolith-shaped substrate (support) 51 having a zeolite membrane formed thereon can be disposed in a predetermined position by means of an O-ring 33 on the outer peripheral portions of both the ends. The SUS module 37 is separated into the raw material side space 31 and the permeation side space 32 by the glass seal (seal portion 12) and the zeolite membrane 11.

By the aforementioned constitution, a gas mixture as a raw material where a predetermined pressure is applied by a pressure controller is supplied to the raw material side space 31 of the SUS module 37 by the supply fluid introduction port 37a. The mixture is brought into contact with a membrane supply side 11a of the zeolite membrane 11 as a supply mixture from the supply fluid introduction portion 37a. With the pressure difference between the membrane supply side and the membrane permeation side of the zeolite membrane 11 as a drive force, a specific component permeates toward the membrane permeation side 11b and is discharged from the permeation fluid collection port 37c, thereby separating the mixed fluid.

EXAMPLE

Hereinbelow, the present invention will be described in more detail on the basis of Examples. However, the present invention is not limited to these Examples.

Example 1

Preparation of Seeding Sol

There were mixed 31.22 g of 40 mass % tetrapropylammonium hydroxide solution (produced by SACHEM Chemical Company) and 16.29 g of tetrapropylammonium bromide (produced by Wako Pure Chemical Industries, Ltd.), and 71.25 g of distilled water and 82 g of approximately 30 mass % silica sol (trade name of Snowtex S produced by Nissan Chemical Industries, Ltd.) were further added. They were stirred with a magnetic stirrer at room temperature for 30 minutes to obtain a seeding sol.

(Formation of Zeolite Seed Crystal)

Figure 3:
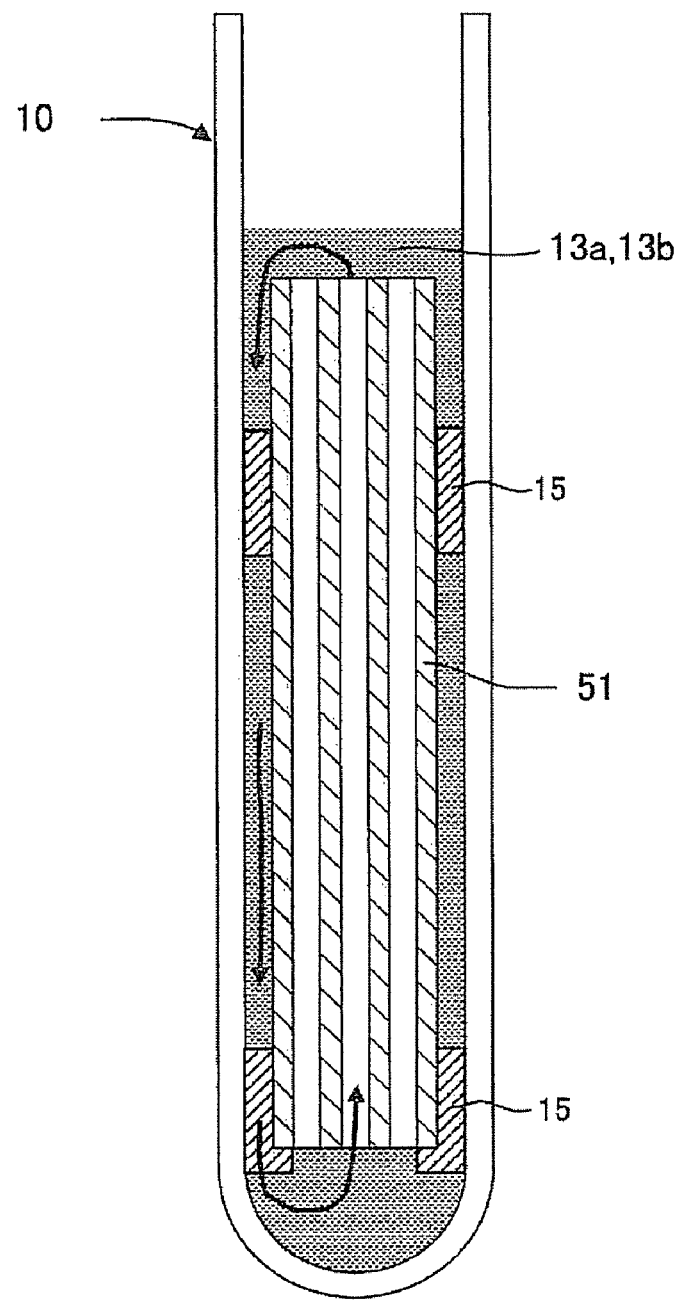
FIG. 3 is a cross-sectional view schematically showing the state that a support and silica sol is put in a pressure resistant container.

The resultant seeding sol 13a was put in a 300 ml fluorine resin pressure resistant container 10 as shown in FIG. 3, and a monolith-shaped porous alumina support 51 having a diameter of 30 mm, a length of 160 mm and having glass seals (seal portions 12) on both the end portions and having 37 straight holes each having a diameter of 3 mm was immersed in the sol after covering the outside with a fluorine resin tape to react in a hot air drier at 110° C. for 12 hours. The support 51 was fixed to the pressure resistant container 10 by a fluorine resin receiving jig 15. After the reaction, the fluorine resin tape on the outside was removed, and the support 51 was subjected to boil washing five times, followed by drying at 80° C. for 16 hours. The MFI type zeolite was confirmed by X-ray diffraction of the crystal particles after the reaction.

(Preparation of Membrane-Forming Sol)

There were mixed 0.80 g of 40 mass % tetrapropylammonium hydroxide solution (produced by SACHEM Chemical Company) and 0.42 g of tetrapropylammonium bromide (produced by Wako Pure Chemical Industries, Ltd.), and 193.26 g of distilled water and 6.3 g of approximately 30 mass % silica sol (trade name of Snowtex S produced by Nissan Chemical Industries, Ltd.) were further added. They were stirred with a magnetic stirrer at room temperature for 30 minutes.

(Formation of Zeolite Membrane)

The resultant membrane-forming sol 13b was put in a 300 ml fluorine resin pressure resistant container 10 as shown in FIG. 3 in the same manner as in the aforementioned "Formation of zeolite seed crystal", and the aforementioned porous alumina support 51 where the zeolite seed crystals had precipitated was immersed in the sol after covering the outside with a fluorine resin tape. The temperature was raised to 160° C. for reaction in a hot air drier at 160° C. for 24 hours, and then the temperature was decreased. After the reaction, the fluorine resin tape on the outside was removed, and the support 51 was subjected to boil washing five times, followed by drying at 80° C. for 16 hours to obtain a zeolite separation membrane-provided article. Then, the step for removing the structure directing agent from the zeolite separation membrane-provided article was performed with the temperature rise speed of 0.2° C./min., maintenance of the heating temperature of 600° C. for 4 hours, and the temperature fall speed of 1° C./min. The MFI type zeolite was confirmed by X-ray diffraction of the device layers inside the channels after the reaction.

Example 2

In the step of removing the structure directing agent, a zeolite separation membrane-provided article was put in an electric furnace whose temperature was raised to 600° C. and maintained before the zeolite separation membrane-provided article was put therein (The temperature rise speed was higher than 0.2° C./min.) and allowed to stand still. After 24 hours passed, it was taken out from the electric furnace (The temperature fall speed was higher than 1° C./min.). The zeolite separation membrane-provided article was obtained from the same steps as in Example 1 except for the above operations. The MFI type zeolite was confirmed by X-ray diffraction of the device layers inside the channels after the reaction.

Example 3

By the use of a zeolite separation membrane-provided article obtained from the same steps as in Example 1, the step of removing the structure directing agent was performed with the temperature rise speed of 0.1° C./min., maintenance of the heating temperature of 600° C. for 4 hours, and the temperature fall speed of 0.5° C./min. The MFI type zeolite was confirmed by X-ray diffraction of the dense layers inside the channels after the reaction.

Comparative Example 1

The production was performed according to the Non Patent Document 1 (Separation Purification Technology, 25 (2001) 297-306) described in the background art. There were mixed 12.69 g of 40 mass % tetrapropylammonium hydroxide solution (produced by SACHEM Chemical Company) and 6.62 g of tetrapropylammonium bromide (produced by Wako Pure Chemical Industries, Ltd.), and 203.05 g of distilled water and 20 g of approximately 30 mass % silica sol (trade name of Snowtex S produced by Nissan Chemical Industries, Ltd.) were further added. They were stirred with a magnetic stirrer at room temperature for 30 minutes to obtain a seeding sol.

This seeding sol was put in a fluorine resin pressure resistant container, and a monolith-shaped porous alumina support having a diameter of 30 mm, a length of 160 mm and having glass seals on both the end portions and having 37 straight holes each having a diameter of 3 mm was immersed in the sol after covering the outside with a fluorine resin tape to react in a hot air drier at 180° C. for 30 hours. After the reaction, the fluorine resin tape on the outside was removed, and the support was subjected to boil washing five times, followed by drying at 80° C. for 16 hours to obtain a zeolite separation membrane-provided article. Then, the step for removing the structure directing agent from the zeolite separation membrane-provided article was performed with the temperature rise speed of 0.1° C./min., maintenance of the heating temperature of 500° C. for 4 hours, and the temperature fall speed of 0.1° C./min. The MFI type zeolite was confirmed by X-ray diffraction of the crystal particles after the reaction.

Comparative Example 2

Each of the tetrapropylammonium hydroxide solution and the tetrapropylammonium bromide for the seeding sol was one tenth of Example 1, and each of the tetrapropylammonium hydroxide solution and the tetrapropylammonium bromide for the membrane-forming sol was one tenth of Example 1. The other conditions were the same as those of Example 1.

Comparative Example 3

By the use of a zeolite separation membrane-provided article obtained from the same steps as in Example 1, the step of removing the structure directing agent was performed with the temperature rise speed of 0.01° C./min., maintenance of the heating temperature of 600° C. for 4 hours, and the temperature fall speed of 0.05° C./min. The MFI type zeolite was confirmed by X-ray diffraction of the dense layers inside the pores after the reaction.

Comparative Example 4

Titanium isopropoxide was subjected to hydrolysis in the presence of nitric acid to obtain a titania sol. The titania sol was diluted with distilled water to obtain a sol solution, and it was sent in and brought into contact with the inside of substrate cells to form membranes in the cells. Then, the sample was dried and subjected to a thermal treatment at 500° C.

(Pore Distribution Measurement by $N_2$ Adsorption Method)

The pore volume and the pore distribution were measured with respect to the zeolite membrane in each of zeolite membrane-provided articles of Example 3 and Comparative Example 4. The target to be measured was pores having a pore diameter of 40 nm or less, the measurement was performed by a nitrogen adsorption method (−196° C.) with a measurement apparatus of ASAP 2020 produced by Micromeritics Instrument Corporation. To the analysis of the measurement results, the Saito-Foley method was applied in the pore diameter range of 2 nm or less, and the Barrett-Joyner-Halenda method was applied in the pore diameter range of 2 to 40 nm. The entire pore volume was the sum of the volume of pores having pore diameters of 2 nm or less and the volume of pores having pore diameters in the range of 2 to 40 nm.

Figure 8:
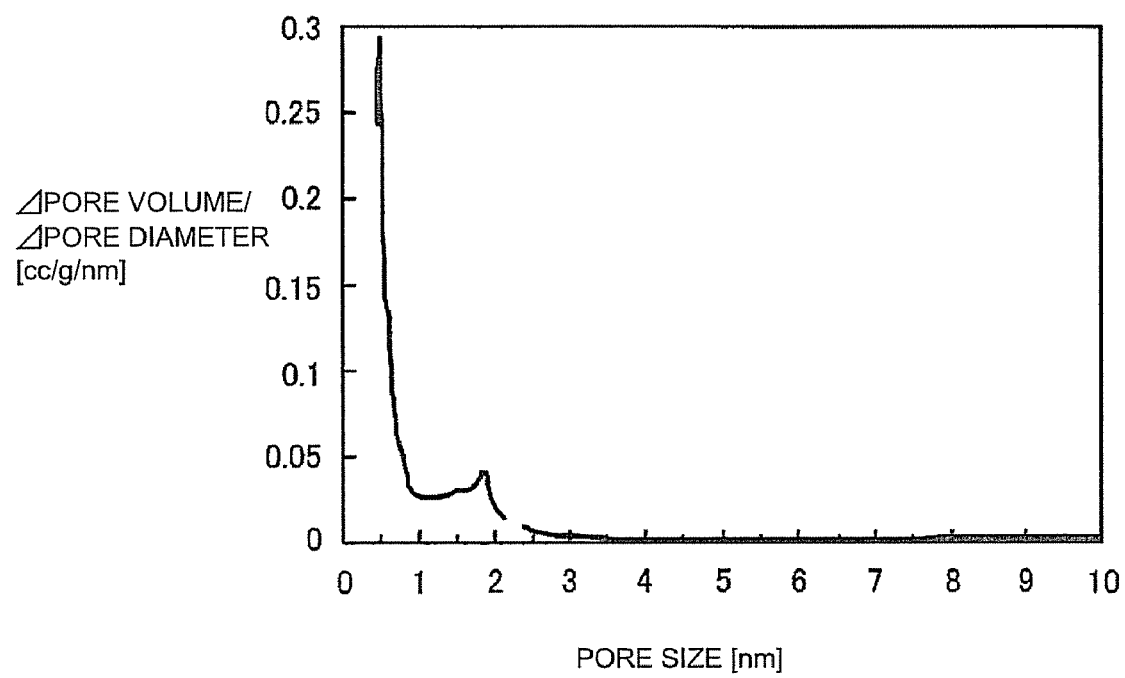
FIG. 8 is a view showing a result of measuring pore distribution regarding a zeolite membrane.

The results of measuring the pore distribution of the zeolite membrane of the zeolite membrane-provided article of Example 3 are shown in FIG. 8. Example 3 had a sharp peak in a pore diameter range of 0.76 nm or less and a broad peak in the vicinity of a pore diameter range of 0.76 to 2 nm. The entire pore volume of the pores having pore diameters up to 40 nm was 0.2 cc/g, the pore volume of the pores having pore diameters of 0.76 nm or less was 0.15 cc/g, the pore volume of the pores having pore diameters of 0.76 to 2 nm was 0.04 cc/g, and the pore volume of the pores having pore diameters of 2 to 40 nm was 0.01 cc/g. While the pore volume of pores having pore diameters of 0.76 to 2 nm was 0.04 cc/g in the narrow range of 1.24 nm, the pore volume of the pores having pore diameters of 2 to 40 nm was 0.01 cc/g in the wide range of 38 nm. Therefore, it can be said that there is no pore having a pore diameter practically larger than 2 nm.

The pore diameters of Comparative Example 4 were measured in the same manner as in Example 1 to find a peak in the pore diameter range of 1 nm or less and a broad peak in the pore diameter range of 2 to 4 nm.

(Single Component Gas Permeation Test)

Figure 4:
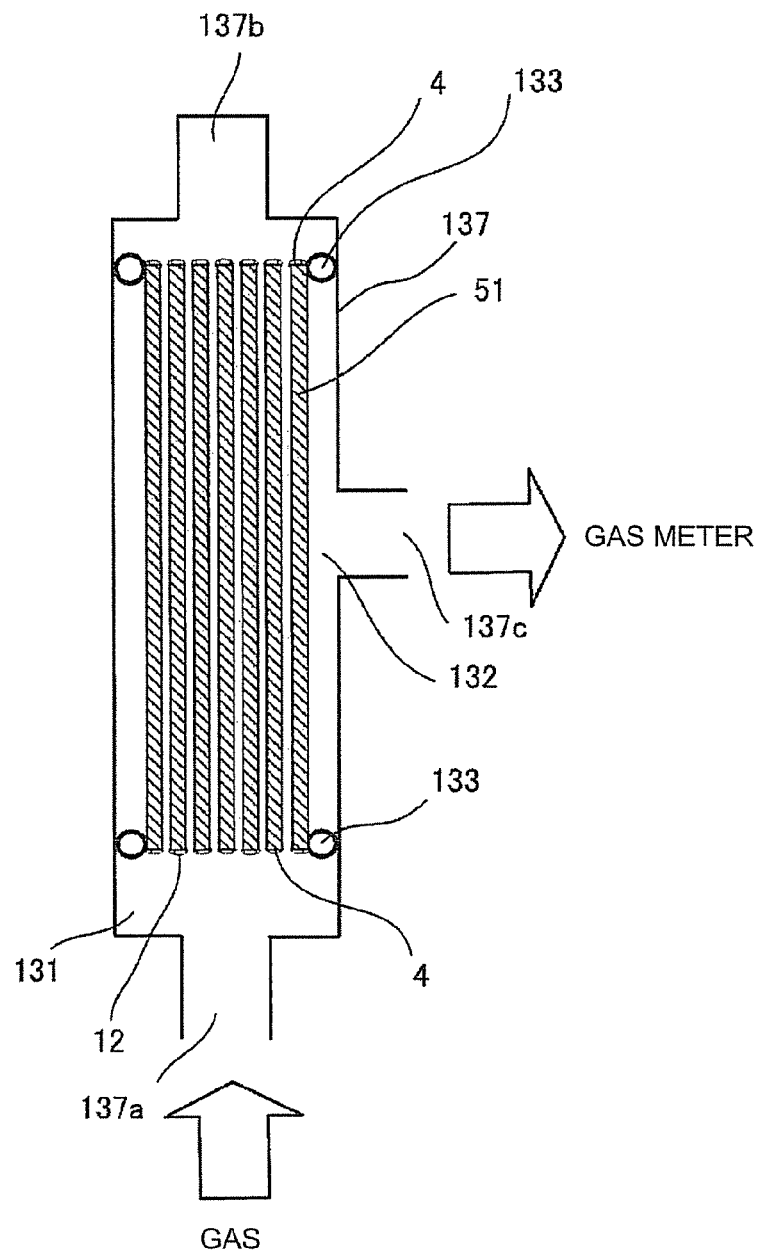
FIG. 4 is an explanatory view schematically showing constitution of a gas permeation test apparatus used for a gas permeation test.

An apparatus shown in FIG. 4 was used to carry out a single component gas ($N_2$) permeation test. The zeolite separation membrane-provided article put in a SUS casing by means of an o-ring 133 provided in the outer peripheral portions of both the ends (SUS module 137) was disposed at a predetermined position. The SUS module 137 was separated into a gas supply side space 131 and a gas permeation side space 132 by an o-ring 133, a glass seal (seal portion 12), and a zeolite membrane. Since the gas supply side space 131 was closed in the latter part of the SUS module 137, the gas was supplied to the supply side space of the SUS module 137 from the supply gas introduction port 137a by an evaluation gas bomb connected on the supply side, and the gas discharged from the supply gas discharge port 137b accumulated to apply a predetermined pressure to a membrane. In the present experiment, a gauge pressure of the gas supply side space 131 was 0.1 MPa, and the pressure in the gas permeation side space 132 was atmospheric pressure. After the stability of the permeation flow rate was confirmed, measurement was performed by a dry gas meter or a soap membrane flowmeter provided on the gas collection port 137c side for a fixed period of time to evaluate the permeation speed ($nmol \cdot m^{-2} \cdot s^{-1} \cdot Pa^{-1}$).

(Single Component Pervaporation (PV) Test of 1,3,5-Trimethylbenzene)

The pervaporation was performed by the use of a mixture separation device 101 as shown in FIGS. 5 to 6. 1,3,5-trimethylbenzene put in a tank was heated and maintained at a predetermined temperature (about 50° C.) by a raw material tank 35.

By the constitution of FIGS. 5 and 6, a raw material was supplied to the raw material side space 31 of the SUS module 37 from the supply fluid introduction port 37a by a circulation pump 36, and the raw material discharged from the supply fluid discharge port 37b is returned to the raw material 35 to allow the raw material to circulate. By reducing the pressure on the support side of the separation membrane 11 with the vacuum pump 39, the permeation steam permeating toward the membrane permeation side 11b of the separation membrane 11 and discharged from the permeation fluid collection port 37c was collected by a liquid $N_2$ trap. The degree of vacuum of the permeation side space 32 is controlled to be a predetermined reduced pressure (e.g, about 0.5 Torr) by a pressure controller. This enables to change the composition of the liquid mixture.

The test was performed with 1,3,5-trimethylbenzene at 50° C. with a degree of vacuum of 0.2 torr and a measurement time of 30 min. The mass of the liquid obtained was weighed with an electronic balance, and the component of liquid was analyzed by a gas chromatography. The permeation speed obtained as a result of the aforementioned pervaporation test is shown in Table 1.

(Rhodamine B Dyeing Test)

An aqueous solution of 0.3 mass % Rhodamine B was produced and pored inside the membrane (through-holes), and presence/absence of dyeing on the outside substrate was confirmed by eye observation and an optical microscope. The results are shown in Table 1.

TABLE 1

| | Single component gas permeation test result Permeation speed [$nmol \cdot m^{-2} \cdot s^{-1} \cdot Pa^{-1}$] | | PV test result Permeation speed [$nmol \cdot m^{-2} \cdot s^{-1} \cdot Pa^{-1}$] | Dyeing test Presence/absence of dyeing | Permeation speed ratio 1,3,5-trimethyl |
|---|---|---|---|---|---|
| | $N_2$ (before removing TP) | $N_2$ (after removing TP) | 1,3,5-trimethylbenzene | Rhodamine B | Benzene/$N_2$ |
| Example 1 | Detection limit or lower | 1877 | 328 | None | 0.17 |
| Example 2 | Detection limit or lower | 2373 | 481 | None | 0.20 |
| Example 3 | Detection limit or lower | 1381 | 254 | None | 0.18 |
| Comp. Ex. 1 | Detection limit or lower | 863 | 0 | None | 0.00 |
| Comp. Ex. 2 | Detection limit or lower | 2835 | Not measured | Present | — |
| Comp. Ex. 3 | Detection limit or lower | 1420 | 181 | None | 0.13 |
| Comp. Ex. 4 | Detection limit or higher | (No TP removal) | Not measured | Present | — |

* TP removal means removal of the structure directing agent.

As shown in Table 1, after the removal of the structure directing agent, in Examples 1 to 3, the permeation speed of nitrogen ($N_2$) was $1.0 \times 10^{-6}$ $mol \cdot m^{-2} \cdot s^{-1} \cdot Pa^{-1}$ or more and the permeation speed ratio of 1,3,5-trimethylbenzene/$N_2$ permeation speed ratio was 0.17 or more. In addition, there was no dyeing by the impregnation with Rhodamine B. Therefore, since the permeation speed of nitrogen was high, it was found out that the amount of through-pores capable of permeation was sufficient. In addition, by the 1,3,5-trimethylbenzene/$N_2$ permeation speed ratio, it was found that the pores having pore diameters of 0.76 nm or more were present sufficiently among the entire pores. Further, since no dyeing by the impregnation with Rhodamine B was found, it was found out that the pore diameters were about 2 nm or less. From the above, each of Examples 1 to 3 was a zeolite separation membrane-provided article having pores inherent to the zeolite crystals and pores other than the pores inherent to the zeolite crystals in the range of 0.76 nm or more and about 2 nm or less. In addition, since the order of 1,3,5-trimethylbenzene permeation speed from the highest is Example 2, Example 1, and Example 3, the order of the amount of pores other than the pores inherent to the zeolite crystals from the highest is Example 2, Example 1, and Example 3. In addition, by the pore distribution measurement by a $N_2$ adsorption method of Example 3, it was confirmed that it had a sharp peak in the pore diameter range of 0.76 nm or less, a broad peak in the pore diameter range of 0.76 to 2 nm, and no peak in the pore diameter range of 2 nm or more.

In Comparative Example 1, since the temperature fall speed in the heat treatment where the structure directing agent was removed was so slow as 0.1° C./min., there was no pore other than the pores inherent to zeolite crystals, and 1,3,5-trimethylbenzene did not permeate. In Comparative Example 2, since a dense membrane could not be obtained because the amount of the structure directing agent is small, there was the dyeing by the impregnation with Rhodamine B. In Comparative Example 3, since the temperature rise speed in the heat treatment for removing the structure directing agent was so slow as 0.01° C./min., there are few pores other than the pores inherent to zeolite crystals, and the 1,3,5-trimethylbenzene/$N_2$ permeation speed ratio was not sufficient. In Comparative Example 4, since the pores were large, there was the dyeing by the impregnation with Rhodamine B.

Next, description will be given regarding the pervaporation (PV) test of ethanol/water, n-hexane/benzene, n-heptane/toluene, and n-hexane/2,2-dimethylbutane and a mixed gas separation test of propylene/argon. In these separation tests, since separation performance was not confirmed in each of Comparative Examples 2, 4, it was not written in Tables 2 to 6. Incidentally, regarding the increase and decrease of the permeation flux of permeable components and the increase and decrease of the separation coefficient, the amount ratio was shown by % with values of the Comparative Example 3 having few pores other than the pores inherent to zeolite crystals as the criteria. Regarding the effect, the criteria of the judgment were that the permeation flux of the permeable component was 150% or more with respect of that of Comparative Example 3 and that the increase and decrease of the separation coefficient was 50% or more with respect to Comparative Examples 3. In the propylene/argon mixed gas separation test, not the increase and decrease of the permeation flux, but the increase and decrease of the permeation speed was used.

(Ethanol (EtOH)/Water Pervaporation (PV) Test)

There was performed an ethanol/water pervaporation test at 70° C. with a permeation side degree of vacuum of 50 torr and a measurement time of 5 min. (between 15 and 20 minutes from the start) in the same manner as in the pervaporation test of 1,3,5-trimethylbenzene. The results are shown in Table 2. Here, the separation coefficient means a value of the ratio of ethanol concentration (mass %) to water concentration (mass %) in the permeation liquid with respect to the ratio of ethanol concentration (mass %) to water concentration (mass %) in the supply liquid as shown in the formula shown below. In addition, the permeation flux (kg/m$^2$/hour) means the mass of the entire substances passed through the separation membrane per unit time (hour) and unit area (m$^2$).

Separation coefficient=((ethanol concentration in permeation liquid)/(water concentration in permeation liquid))/((ethanol concentration in supply liquid)/(water concentration in supply liquid))

TABLE 2

| | Selected permeable component | Permeation flux [kg · m$^{-2}$ · hr$^{-1}$] | | Separation coefficient α | Permeation flux increase and decrease of EtOH | Separation coefficient increase and decrease |
|---|---|---|---|---|---|---|
| | | EtOH | Water | | | |
| Example 1 | EtOH | 2.05 | 0.07 | 32 | 244% | 90% |
| Example 2 | EtOH | 2.71 | 0.08 | 32 | 323% | 92% |
| Example 3 | EtOH | 1.35 | 0.04 | 32 | 161% | 92% |
| Comp. Ex. 1 | EtOH | 0.81 | 0.02 | 35 | 96% | 101% |
| Comp. Ex. 3 | EtOH | 0.84 | 0.02 | 35 | 100% | 100% |

(n-Hexane/Benzene Pervaporation (PV) Test)

The n-hexane/benzene pervaporation (PV) test was performed at 50° C. with a permeation side degree of vacuum of 0.2 torr and a measurement time of 20 min. (between 20 and 40 minutes from the start) in the same manner as described above. The separation coefficient means a value of the ratio of n-hexane concentration (mass %) to benzene concentration (mass %) in the permeation liquid with respect to the ratio of n-hexane concentration (mass %) to benzene concentration (mass %) in the supply liquid as shown in the formula shown below.

Separation coefficient=((n-hexane concentration in permeation liquid)/(benzene concentration in permeation liquid))/((n-hexane concentration in supply liquid)/(benzene concentration in supply liquid))

The results are shown in Table 3.

TABLE 3

| | Selected permeable component | Permeation flux [kg · m$^{-2}$ · hr$^{-1}$] | | Separation coefficient α | Permeation flux increase and decrease of n-hexane | Separation coefficient increase and decrease |
|---|---|---|---|---|---|---|
| | | n-hexane | Benzene | | | |
| Example 1 | n-hexane | 0.438 | 0.003 | 140 | 207% | 83% |
| Example 2 | n-hexane | 0.758 | 0.005 | 141 | 322% | 84% |
| Example 3 | n-hexane | 0.382 | 0.003 | 147 | 162% | 87% |

TABLE 3-continued

|  | Selected permeable component | Permeation flux [kg·m⁻²·hr⁻¹] n-hexane | Permeation flux [kg·m⁻²·hr⁻¹] Benzene | Separation coefficient α | Permeation flux increase and decrease of n-hexane | Separation coefficient increase and decrease |
|---|---|---|---|---|---|---|
| Comp. Ex. 1 | n-hexane | 0.217 | 0.001 | 217 | 92% | 129% |
| Comp. Ex. 3 | n-hexane | 0.236 | 0.001 | 168 | 100% | 100% |

(n-Heptane/Toluene Pervaporation (PV) Test)

The n-heptane/toluene pervaporation (PV) test was performed at 50° C. with a permeation side degree of vacuum of 0.2 torr and a measurement time of 180 min. (between 0 and 180 minutes from the start) in the same manner as described above. The separation coefficient means a value of the ratio of n-heptane concentration (mass %) to toluene concentration (mass %) in the permeation liquid with respect to the ratio of n-heptane concentration (mass %) to toluene concentration (mass %) in the supply liquid as shown in the formula shown below.

Separation coefficient=((n-heptane concentration in permeation liquid)/(toluene concentration in permeation liquid))/((n-heptane concentration in supply liquid)/(toluene concentration in supply liquid))

The results are shown in Table 4.

TABLE 4

|  | Selected permeable component | Permeation flux [kg·m⁻²·hr⁻¹] n-heptane | Permeation flux [kg·m⁻²·hr⁻¹] Toluene | Separation coefficient α | Permeation flux increase and decrease of n-heptane | Separation coefficient increase and decrease |
|---|---|---|---|---|---|---|
| Example 1 | n-heptane | 0.559 | 0.002 | 234 | 201% | 84% |
| Example 2 | n-heptane | 0.884 | 0.005 | 178 | 317% | 64% |
| Example 3 | n-heptane | 0.445 | 0.002 | 255 | 159% | 92% |
| Comp. Ex. 1 | n-heptane | 0.268 | 0.001 | 298 | 96% | 107% |
| Comp. Ex. 3 | n-heptane | 0.279 | 0.001 | 279 | 100% | 100% |

(n-Hexane/2,2-Dimethylbutane Pervaporation (EV) Test)

The n-hexane/2,2-dimethylbutane pervaporation (PV) test was performed at 35° C. with a permeation side degree of vacuum of 0.2 torr and a measurement time of 180 min. (between 0 and 180 minutes from the start) in the same manner as described above. The separation coefficient means a value of the ratio of n-hexane concentration (mass %) to 2,2-dimethylbutane concentration (mass %) in the permeation liquid with respect to the ratio of n-hexane concentration (mass %) to 2,2-dimethylbutane concentration (mass %) in the supply liquid as shown in the formula shown below.

Separation coefficient=((n-hexane concentration in permeation liquid)/(2,2-dimethylbutane concentration in permeation liquid))/((n-hexane concentration in supply liquid)/(2,2-dimethylbutane concentration in supply liquid))

The results are shown in Table 5.

TABLE 5

|  | Selected permeable component | Permeation flux [kg·m⁻²·hr⁻¹] n-hexane | Permeation flux [kg·m⁻²·hr⁻¹] 2,2-dimethylbutane | Separation coefficient α | Permeation flux increase and decrease of n-heptane | Separation coefficient increase and decrease |
|---|---|---|---|---|---|---|
| Example 1 | n-hexane | 0.241 | 0.002 | 109 | 193% | 79% |
| Example 2 | n-hexane | 0.406 | 0.004 | 111 | 326% | 80% |
| Example 3 | n-hexane | 0.200 | 0.002 | 125 | 160% | 90% |
| Comp. Ex. 1 | n-hexane | 0.119 | 0.001 | 159 | 96% | 115% |
| Comp. Ex. 3 | n-hexane | 0.125 | 0.001 | 139 | 100% | 100% |

(Propylene/Argon Mixed Gas Separation Test)

A mixed gas separation test was performed by the use of a mixture separation device 102 as shown in FIGS. 5 and 7. By the constitution of FIGS. 6 and 7, a raw material was supplied to the raw material space 31 of the SUS module 37 from the supply fluid introduction port 37a. With the pressure difference between the membrane supply side and the membrane permeation side of the zeolite membrane 11 as a drive force, a specific component permeated toward the membrane permeation side 11b and was discharged from the permeation fluid collection port 37c, thereby separating the mixed fluid.

The test was performed at 30° C. with a supply side pressure of 0.7 MPa (absolute pressure) and a permeation side pressure of 0.1 MPa (absolute pressure). The permeation gas flow rate was measured by a dry gas meter or a soap membrane flowmeter provided on the gas collection port 137c side to evaluate the permeation speed (nmol·m$^{-2}$·s$^{-1}$·Pa$^{-1}$). The composition of permeation gas was analyzed by a gas chromatography. The permeation speed obtained as a result of the aforementioned mixed gas separation test is shown in Table 6. The separation coefficient means a value of the ratio of propylene concentration (mass %) to argon concentration (mass %) in the permeation liquid with respect to the ratio of propylene concentration (mass %) to argon concentration (mass %) in the supply liquid as shown in the formula shown below.

Separation coefficient=((propylene concentration in permeation gas)/(argon concentration in permeation gas))/((propylene concentration in supply gas)/(argon concentration in supply gas))

The results are shown in Table 6.

high permeability and high separability in the separation of ethanol/water, n-hexane/benzene, n-heptane/toluene, n-hexane/2,2-dimethylbutane, and propylene/argon. This seems to be because the pores inherent to the zeolite crystals are in the range of 0.76 nm or less and because gaps or pores larger than the pores inherent to the zeolite crystals are in the range of 0.76 nm to about 2 nm, where both high permeability and high separability can be achieved in these separation systems.

INDUSTRIAL APPLICABILITY

Since a zeolite separation membrane-provided article of the present invention has gaps or pores larger than pores of the zeolite crystals and controlled to be within an appropriate range of 0.76 nm or more and about 2 nm or less, both high permeability and high separability can be achieved in the case of performing separation of linear chain hydrocarbon from side chain hydrocarbon, linear chain hydrocarbon from aromatic hydrocarbon, alcohol from water, linear chain saturated hydrocarbon from inorganic gas.

DESCRIPTION OF REFERENCE NUMERALS

4: end face, 10: pressure resistant container, 11: zeolite membrane, 11a: membrane supply side, 11b: membrane permeation side, 12: seal portion, 13a: seeding sol, 13b: membrane-forming sol, 14: fluorine resin inner cylinder, 15: receiving jig, 31: raw material side space, 32: permeation side space, 33: o-ring, 35: raw tank, 36: circulation pump, 37: SUS module, 37a: supply fluid introduction port, 37b: supply fluid

TABLE 6

| | Selected permeable component | Permeation flux [kg·m$^{-2}$·hr$^{-1}$] | | Separation coefficient α | Permeation flux increase and decrease of n-hexane | Separation coefficient increase and decrease |
| --- | --- | --- | --- | --- | --- | --- |
| | | Propylene | Argon | | | |
| Example 1 | Propylene | 104 | 1.1 | 92 | 186% | 87% |
| Example 2 | Propylene | 176 | 2.2 | 80 | 316% | 75% |
| Example 3 | Propylene | 98 | 1.0 | 98 | 175% | 92% |
| Comp. Ex. 1 | Propylene | 52 | 0.4 | 130 | 93% | 123% |
| Comp. Ex. 3 | Propylene | 56 | 0.5 | 106 | 100% | 100% |

As shown in Tables 2 to 6, it was confirmed that both high permeability and high separability can be achieved in the separation tests of ethanol/water, n-hexane/benzene, n-heptane/toluene, n-hexane/2,2-dimethylbutane, and propylene/argon in Examples 1 to 3 in comparison with Comparative Examples 1 to 4.

In Examples 1 to 3, the permeation speed of nitrogen (N$_2$) was 1.0×10$^{-6}$ mol·m$^{-2}$·s$^{-1}$·Pa$^{-1}$ or more, the permeation speed ratio of 1,3,5-trimethylbenzene/N$_2$ permeation speed ratio was 0.17 or more, and there was no dyeing by the impregnation with Rhodamine B. Therefore, it was confirmed that the articles had pores larger than the pores inherent to the zeolite crystals in the range of 0.76 nm to about 2 nm in addition to the pores inherent to the zeolite crystals. In addition, since the order of permeation speed of 1,3,5-trimethylbenzene from the highest was Example 2, Example 1, and Example 3, it can be said that the amount of pores other than the pores inherent to the zeolite crystals from the highest was Example 2, Example 1, and Example 3. In addition, it was confirmed that there is practically no pores in the range of about 2 nm or more.

As shown in Tables 2 to 6, a zeolite membrane-provided article provided by the present application can achieve both discharge port, 37c: permeation fluid collection port, 38: cooling trap, 39: vacuum pump, 40: pressure controller, 51: support, 52: passage (channel), 53: axial direction, 54: porous article, 101: mixed fluid separation device, 102: mixed fluid separation device, 131: gas supply side space, 132: permeation side space, 133: o-ring, 137: SUS module, 137a: supply gas introduction port, 137b: supply gas discharge port, 137c: gas collection port.

The invention claimed is:

1. A zeolite membrane-provided article provided with a zeolite membrane, the zeolite membrane-provided article having an N$_2$ gas permeation speed at room temperature of 1.0×10$^{-6}$ mol·m$^{-2}$·s$^{-1}$·Pa$^{-1}$ or more and a permeation speed ratio of 1,3,5-trimethylbenzene/N$_2$ at room temperature of 0.17 or more, wherein the zeolite membrane-provided article is free from dyeing caused by the impregnation with Rhodamine B, and wherein pore sizes of pores inherent to zeolite crystals are 0.76 nm or less and pore sizes of pores other than the pores inherent to zeolite crystals are 0.76 nm to 2 nm.

2. The zeolite membrane-provided article according to claim 1, wherein the zeolite membrane is formed on a surface of a support of a porous material.

3. The zeolite membrane-provided article according to claim 1, wherein the zeolite membrane is a MFI membrane.

4. The zeolite membrane-provided article according to claim 1, wherein the zeolite membrane is a silicalite membrane.

5. The zeolite membrane-provided article according to claim 1, which is used for separation of a mixed fluid of two or more different components.

6. A method for producing a zeolite membrane-provided article comprising:
- a seed crystal-forming step of putting a seeding sol containing silica, water, and a structure directing agent and a support in a pressure resistant container in a state that the support is immersed in the seeding sol, followed by heating the inside of the pressure resistant container to form zeolite seed crystals on a surface of the support;
- a membrane-forming step of growing the zeolite seed crystal to form a dense zeolite membrane containing the structure directing agent on the surface of the support; and
- a removal step of removing the structure directing agent from the dense zeolite membrane;
- wherein the removal treatment in the removal step is performed by a heat treatment;
- wherein the heat treatment is performed in a maximum temperature range of 400 to 1000° C. and includes a temperature rise step at a temperature rise speed of 0.1° C./min. or more and a temperature fall step at a temperature fall speed of 0.5° C./min. or more;
- whereby the zeolite membrane-provided article provided with a zeolite membrane has an $N_2$ gas permeation speed at room temperature of $1.0 \times 10^{-6}$ $mol \cdot m^{-2} \cdot s^{-1} \cdot Pa^{-1}$ or more, a permeation speed ratio of 1,3,5-trimethylbenzene/$N_2$ at room temperature of 0.17 or more, and is free from dyeing caused by the impregnation with Rhodamine B, and wherein pore sizes of pores inherent to zeolite crystals are 0.76 nm or less and pore sizes of pores other than the pores inherent to zeolite crystals are 0.76 nm to 2 nm.

7. The method for producing a zeolite membrane-provided article according to claim 6, wherein the zeolite membrane is a MFI membrane.

8. The method for producing a zeolite membrane-provided article according to claim 6, wherein the zeolite membrane is a silicalite membrane.

9. A method for separating a mixed fluid, wherein a mixed fluid of two or more different components is separated by using a zeolite membrane-provided article according to claim 1.

10. A mixed fluid separation device having a zeolite separation membrane-provided article according to claim 1 and comprising: a separation section for separating a raw material side space from a permeation side space by a porous substrate, a supply section for supplying a mixed fluid to the raw material side space, a permeation collection section for collecting permeation liquid and/or permeation gas having penetrated the zeolite membrane.

11. The method for producing a zeolite membrane-provided article according to claim 7, wherein the zeolite membrane is a silicalite membrane.

* * * * *